US008099216B2

(12) United States Patent
Matsuura et al.

(10) Patent No.: US 8,099,216 B2
(45) Date of Patent: Jan. 17, 2012

(54) VEHICLE DRIVING POSITION CONTROL SYSTEM AND METHOD

(75) Inventors: Mitsuyasu Matsuura, Chiryu (JP); Toshihiro Hattori, Okazaki (JP); Hirotane Ikeda, Nagoya (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 861 days.

(21) Appl. No.: 12/153,826

(22) Filed: May 27, 2008

(65) Prior Publication Data
US 2008/0312796 A1 Dec. 18, 2008

(30) Foreign Application Priority Data
Jun. 13, 2007 (JP) .................................. 2007-156817

(51) Int. Cl.
*B60R 22/00* (2006.01)
(52) U.S. Cl. .......................................................... 701/49
(58) Field of Classification Search .................... 701/49, 701/124, 29, 32; 706/10, 11, 12
See application file for complete search history.

(56) References Cited

U.S. PATENT DOCUMENTS

| 4,204,255 | A | * | 5/1980 | Cremer | 701/49 |
| 4,477,874 | A | * | 10/1984 | Ikuta et al. | 701/49 |
| 4,707,788 | A | * | 11/1987 | Tashiro et al. | 701/49 |
| 5,254,924 | A | * | 10/1993 | Ogasawara | 318/590 |
| 5,822,707 | A | * | 10/1998 | Breed et al. | 701/49 |
| 5,987,370 | A | * | 11/1999 | Murphy et al. | 701/45 |
| 6,078,854 | A | * | 6/2000 | Breed et al. | 701/49 |
| 6,253,134 | B1 | * | 6/2001 | Breed et al. | 701/49 |
| 6,282,475 | B1 | * | 8/2001 | Washington | 701/49 |
| 6,450,530 | B1 | * | 9/2002 | Frasher et al. | 280/735 |
| 6,784,379 | B2 | * | 8/2004 | Breed et al. | 177/144 |
| 6,830,123 | B2 | * | 12/2004 | Ohki et al. | 180/326 |
| 6,993,423 | B2 | * | 1/2006 | Inman et al. | 701/49 |
| 7,228,213 | B2 | * | 6/2007 | Sakai et al. | 701/49 |
| 2004/0122574 | A1 | * | 6/2004 | Inman et al. | 701/49 |
| 2007/0021893 | A1 | * | 1/2007 | Ikeda et al. | 701/49 |
| 2007/0119647 | A1 | * | 5/2007 | Kusunoki | 180/326 |

FOREIGN PATENT DOCUMENTS

| JP | A-2000-079855 | 3/2000 |
| JP | A-2002-104105 | 4/2002 |
| JP | A-2002-120670 | 4/2002 |
| JP | A-2005-022599 | 1/2005 |
| JP | A-2005-246997 | 9/2005 |
| JP | A-2005-254986 | 9/2005 |
| JP | A-2006-219009 | 8/2006 |

OTHER PUBLICATIONS

U.S. Appl. No. 11/902,213, filed Sep. 20, 2007, Hattori et al.

* cited by examiner

*Primary Examiner* — Darnell Jayne
*Assistant Examiner* — Patrick Hawn
(74) *Attorney, Agent, or Firm* — Posz Law Group, PLC

(57) ABSTRACT

A detector detects at least one of environmental information on the environment and physical information on the user's physical condition, when the user gets into a vehicle. Each of the environment and the physical condition is divided into a plurality of zones. A memory stores statistical data each representing the probability of the user selecting one of the driving positions in the vehicle in one of the zones. One of the driving positions can, from the probabilities allotted to them, be estimated to be optimum for the user in the zone into which the detected information falls. As a result, even if the user's preference in driving position changes with the environment or the user's physical condition in which the user gets into the vehicle, it is possible to adjust the driving position automatically according to the current preference.

19 Claims, 7 Drawing Sheets

US 8,099,216 B2

VEHICLE DRIVING POSITION CONTROL SYSTEM AND METHOD

CROSS REFERENCE TO RELATED APPLICATION

This application is based on and incorporates herein by reference Japanese Patent Application No. 2007-156817 filed on Jun. 13, 2007.

FIELD OF THE INVENTION

The present invention relates to a vehicle driving position control system and method for adjusting the driving position in a vehicle automatically for a user.

BACKGROUND OF THE INVENTION

JP 2006-219009A discloses a system for adjusting the driver seat and other parts in a vehicle automatically for a user. The system estimates the driver's body figure based on the information on the driver which is transmitted from a camera and a sensor. Then, the system calculates adjustment data for the driver's figure and transmits the data to a seat adjuster, etc. The seat adjuster automatically adjusts the position of the driver seat in the forward and backward directions and the angle of the backrest of the seat based on the transmitted data. However, the driving position preferred by each user does not always depend only on his or her figure. Accordingly, it may sometimes be impossible to adjust the driving position to each user's preference.

JP 2002-104105 discloses a system for making it easy to set the positions of seats in a vehicle, the temperature of the air conditioner in it, the angle of a door mirror, etc. The system includes a card slot formed in the vehicle. Each of the users of the vehicle has an IC card, which stores profile information on the preferable driving environment set by him or her at each of the seats (the driver seat, the passenger seat, etc.). When one of the users gets into the vehicle, this user inserts his or her IC card in the card slot, so that the system reads out the associated profile information from the card and controls the appropriate equipment of the vehicle. However, the driving position preferred by each user is not always the same but may change with ambient temperature, time zone, his or her physical condition, etc. in which the user gets into the vehicle. This system cannot cope with the change in each user's preference.

SUMMARY OF THE INVENTION

It is therefore an object of the present invention to provide a vehicle driving position control system and method, which can adjust the driving position in a vehicle accurately to a user's preference even if the preference changes.

According to the present invention, at least one of environmental information on an environment and physical information on a user's physical condition is detected when a user gets into the vehicle. The environment is divided into a plurality of environment zones, and the physical condition is divided into a plurality of condition zones. Statistical data each representing a probability of the user selecting one of candidate driving positions is stored in respect of each zone of the environment or the condition. From the detected information and the stored statistical data, an optimum driving position is estimated as most likely to be optimum for the user in the detected environment or condition zone. The driving position is adjusted to the optimum driving position.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF EMBODIMENTS

First Embodiment

Figure 1:
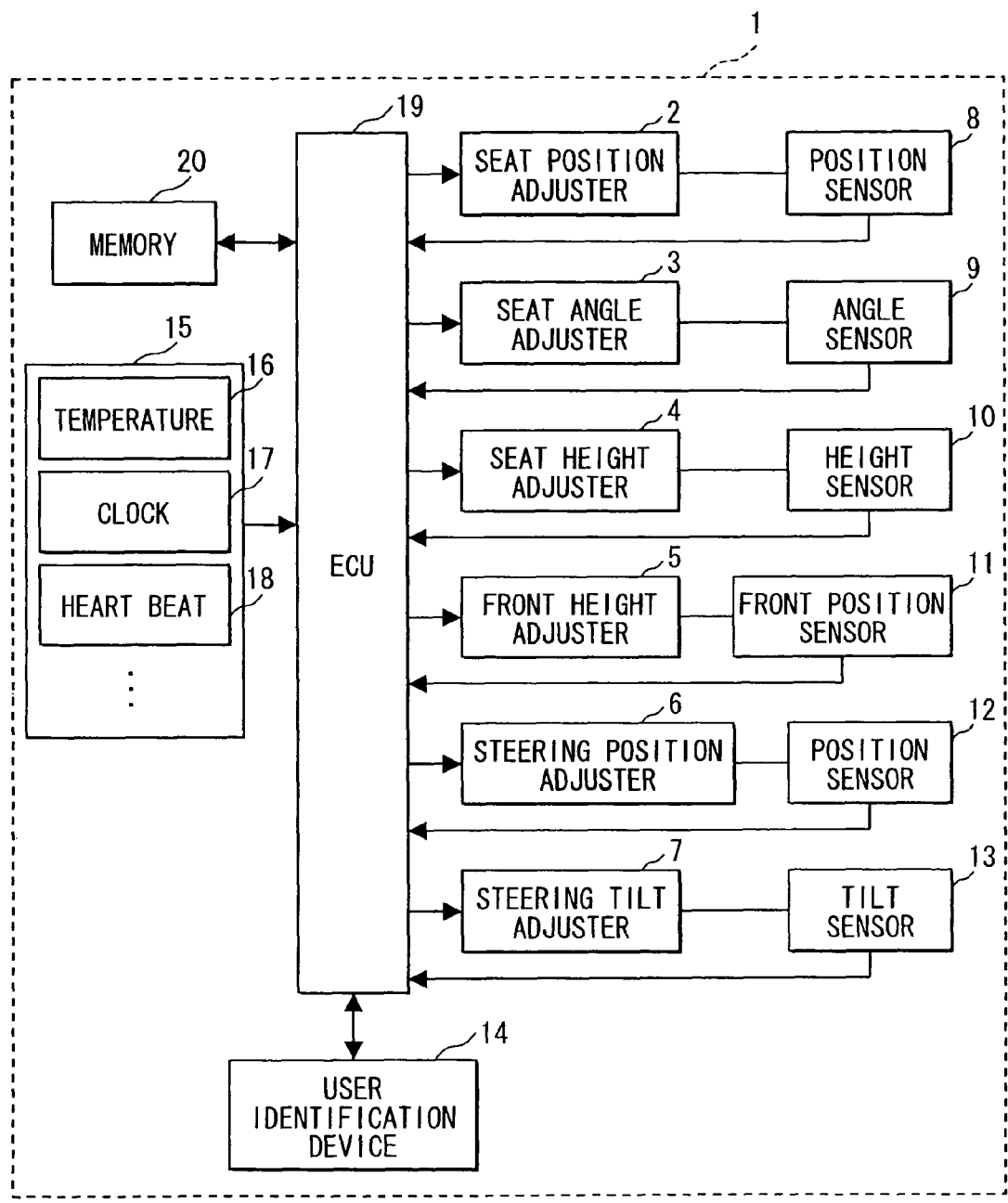
FIG. 1 is a block diagram showing a driving position control system for a vehicle according to a first embodiment of the present invention.

Referring first to FIG. 1, a driving position control system 1 for a vehicle has various devices for adjusting the driving position of a driver, who is a user of the control system 1. The adjusting devices are a seat position adjuster 2, a seat angle adjuster 3, a seat height adjuster 4, a seat front height adjuster 5, a steering wheel position adjuster 6, and a steering wheel tilt adjuster 7. The adjusters 1 to 5 adjust the driver seat (not shown) of the control system 1. The adjusters 6 and 7 adjust the steering wheel (not shown) of the control system 1.

In accordance with a user's switching operation or the like, the seat position adjuster 2 adjusts the position of the driver seat forward and backward by means of an electric motor or another driving source. In accordance with a user's switching operation or the like, the seat angle adjuster 3 adjusts the angle of the back of the driver seat similarly to the seat position adjuster 2. In accordance with a user's switching operation or the like, the seat height adjuster 4 adjusts the height of the bottom of the driver seat. The seat front height adjuster 5 adjusts the height of the front end of the seat bottom.

For the adjustment of the driver seat, the control system 1 may further has a lumber support adjuster, a headrest adjuster and so on. The lumber support adjuster adjusts the position of the lumber support fitted to the back of the driver seat. The headrest adjuster adjusts the height of the headrest of the driver seat. These and other adjusters may be combined arbitrarily for seat adjustment.

In accordance with a user's operation or the like, the steering wheel position adjuster 6 adjusts the position of the steering wheel forward and backward by means of an electric motor or another driving source. The steering wheel tilt adjuster 7 adjusts the tilt angle of the steering wheel. The driver can select a suitable driving position by adjusting the position and tilt angle of the steering wheel.

The control system 1 further has various sensors for sensing the driving position set by the driver. The sensors include a seat position sensor 8, a seat angle sensor 9, a seat height sensor 10, a seat front height sensor 11, a steering wheel position sensor 12, and a steering wheel tilt sensor 13. The sensors 8 to 11 sense the settings of the driver seat. The sensors 12 and 13 sense the settings for the steering wheel. The seat position sensor 8 senses the position of the driver seat in the forward and backward directions. The seat angle sensor 9 senses the angle of the back of the driver seat. The seat height sensor 10 senses the height of the bottom of the driver seat. The seat front height sensor 11 senses the height of the front end of the seat bottom. The steering wheel position sensor 12 senses the position of the steering wheel in the forward and backward directions. The steering wheel tilt sensor 13 senses the tilt angle of the steering wheel.

The control system 1 may be used by two or more registered users. A user identification device 14 outputs to an electronic control unit (ECU) 19 identification information identifying the user who starts using (driving) the control system 1. The identification device 14 may include seat position memory switches or other switches, each of which is allotted to one of the users. When one of the users operates the associated switch, the identification device 14 outputs, to the driving position control system, identification information identifying this user. The identification device 14 may include a switch which the users operate. Different frequencies at which the users operate this switch are allotted to them. Biological information about the users' fingerprints, faces or the like may be registered. The identification device 14 may recognize biological information on the user who starts using the control system 1. Then, the device 14 may compare the recognized information with the registered information so as to identify this user.

The control system 1 further has a sensor group 15 for detecting one or more kinds of environmental information about the driving environment for the vehicle and one or more kinds of physical information about the driver's physical condition. The sensor group 15 includes a temperature sensor 16, an internal clock 17, and a heart beat sensor 18. The temperature sensor 16 senses the air temperature inside and/or the air temperature outside the vehicle. The clock 17 is used to compute the dates and times when the users got into the vehicle and the time for which the vehicle was driven. The beat sensor 18 senses the driver's heart rate.

The heart beat sensor 18 may be a ring type, watch type, or glasses type portable pulse wave sensor, which the driver can put on. The pulse wave sensor radiates light into the driver's skin, senses a pulse wave from the light reflected by the skin, and transmits a signal to the ECU 19 by radio (or wire). Alternatively, the beat sensor 18 may include electrodes, which are arranged on the steering wheel. A heart potential signal can be detected as a pulse wave through the electrodes. The portable pulse wave sensor can sense the driver's heart rate before the driver gets into the vehicle. This makes it possible to quickly adjust the driver's driving position based on the heart rate. It is accordingly preferable that the beat sensor 18 be a pulse wave sensor.

A memory 20 stores sets of statistical data, etc. each for one of the users. The optimum driving position for each of the users can be estimated from the associated set of statistical data, etc. More specifically, each of the driving environment and the physical condition is divided into a plurality of zones, and the driver can select one of candidate driving positions. Each of the stored sets of statistical data represents the probabilities (rates) with each of which the associated user selects one of the driving positions in one of the environment and condition zones. Based on the probabilities of selection allotted to the driving positions for the environment or condition zone into which the information detected by means of each of the sensor group 15 for each of the users falls, it is possible to estimate the optimum driving position for him or her. As a result, even if the preference of each of the users in his or her driving position changes with the driving environment, his or her physical condition or the like in which the user gets into the vehicle, it is possible to adjust the driving position automatically according to the current preference.

Initially, the same probability of selection is allotted to the environment zones and/or condition zones for each of the driving positions in the statistical data in the memory 20. Every time one of the users gets into the vehicle and adjusts his or her driving position, the ECU 19 updates the associated set of statistical data based on the adjusted position and the environmental information and/or physical information detected when the position was adjusted.

More specifically, when one of the users adjusts his or her driving position in one of the environment or condition zones by his or her operation or the like and starts driving the control system 1, the ECU 19 regards the adjusted position as selected finally by this user and increases the probability of selection for this position in this zone. Alternatively, the driving positions selected finally by the users during a specified period and the information detected during this period may be accumulated. After the specified period, the ECU 19 may update the statistical data for the users based on the driving positions and information accumulated for the users. This makes it possible to reflect, in the statistical data for the users, their preferences in their driving positions. Accordingly, based on the statistical data for the users, their driving positions can be adjusted according to their preferences. The initial values may be a normal distribution where the conditions selected for each of the driving positions by the users for the first time are averaged.

The memory 20 further stores sets of likelihood data each for one of the users. Each of the likelihood data of each set is allotted to one the driving positions and represents the estimated likelihood or probability of the associated position being suitable for the associated user. The likelihood data for each of the users is paired with the associated statistical data. Initially, the same estimated likelihood datum is allotted to the driving positions. Every time one of the users adjusts his or her driving position (selects one of the driving positions), the ECU 19 updates the associated set of likelihood data according to the result of the adjustment (selection).

When one of the users performs an operation for adjusting his or her driving position, the ECU 19 outputs, to the adjusters 2 to 7, control signals according to the operation. This adjusts the driving position as preferred by this user. When one of the users gets into the vehicle, the ECU 19 estimates the optimum driving position for this user based on the associated set of statistical data etc. in the memory 20 and outputs, to the adjusters 2 to 7, control signals for making adjustments for the estimated position. In the meantime, the sensors 8 to 13 monitor how much the adjusters 2 to 7 adjust the user's driving position. This results in the user's driving position being adjusted accurately to the estimated optimum position.

Every time one of the users gets into the vehicle, the ECU 19 makes an inference to infer the optimum driving position. Alternatively, the ECU 19 may make an inference, which is described below, after the ECU reflects the results of adjustments of the driving position of one of the users in the associated set of statistical data by updating the data set based on the results of adjustments of the position a specified number of times, or updating the data set based on the results of adjustments made of the position during a specified period.

Figure 2:
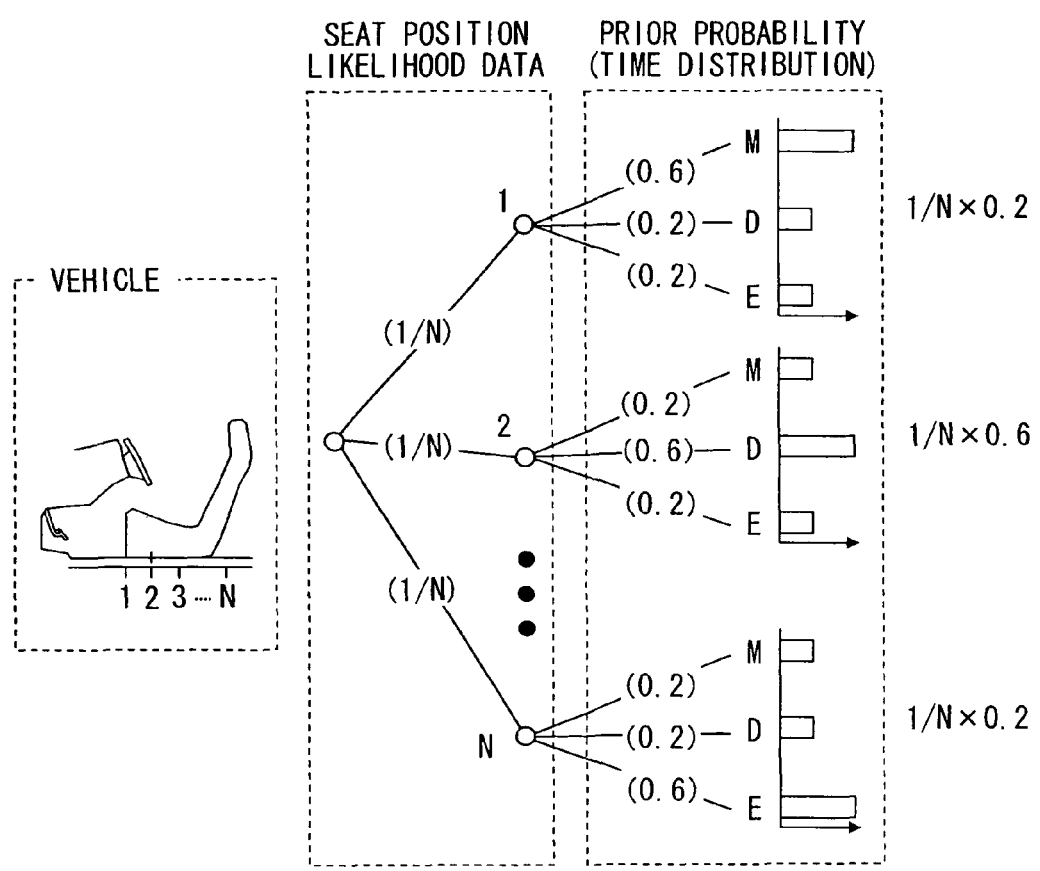
FIG. 2 is an explanatory diagram showing an inference model, with which the driving position control system makes an inference in order to estimate the optimum position of a driver seat of the vehicle in the forward and backward directions according to time zone in which a user gets into the vehicle.

For easy understanding, an example of estimation of a model is shown in FIG. 2, where the ECU 19 estimates the seat position optimum for one of the users at the time (zone) as one of the kinds of environmental information when this user drives the control system 1. It is possible to estimate the optimum positions, heights, and angles of the other movable parts of the driver seat and steering wheel by making inferences similar to a seat position inference as described below.

The ECU 19 makes a Bayesian inference to infer the optimum driving position. As shown in FIG. 2, the ECU 19 makes a Bayesian inference for each of the users in each of the environment or condition zones by building an inference model out of the associated set of statistical data (prior probabilities) and the associated set of likelihood data. The driver seat can occupy some positions in the forward and backward directions so that the statistical data and the likelihood data can be set. In the example shown in FIG. 2, the driver seat can occupy a number N of positions in the forward and backward directions.

The time as one of the kinds of environmental information when the users drive the vehicle is divided into a morning zone M (from 5:00 to 11:00), a daytime zone D (from 11:00 to 16:00) and an evening/night zone E (16:00 to 5:00). The set of statistical data for each of the users represents the rates at each of which the user selected one of the seat positions in the forward and backward directions when the user got into the vehicle during one of the three time zones. For example, according to the statistical data shown in FIG. 2, when the user got into the vehicle during the morning zone, the user selected the seat position 1 at a rate of 0.6 and each of the seat positions 2 and N at a rate of 0.2. When the user got into the vehicle during the daytime zone, the user selected each of the seat positions 1 and N at the rate of 0.2 and the seat position 2 at the rate of 0.6. When the user got into the vehicle during the evening/night zone, the user selected each of the seat positions 1 and 2 at the rate of 0.2 and the seat position N at the rate of 0.6.

The ECU 19 makes an inference for each of the users by applying, to an inference model consisting of the associated sets of statistical data and likelihood data, the environmental information and/or the physical information on him or her which is detected by means of the sensors 16 to 18. For example, if the ECU 19 detects that one of the users got into the vehicle in the daytime zone, the ECU 19 calculates the product (posterior probability) of the estimated likelihood (1 to N) allotted to each of the seat positions 1 to N and the associated rate (probability) allotted to this zone. Then, the ECU 19 estimates that the seat position associated with the largest product will be the seat position likely to be optimum for this user. In the example shown in FIG. 2, the product associated with the seat position 2 is largest, so that the ECU 19 estimates the seat position 2 to be optimum.

At the same time that the inference is made to find the optimum seat position, the ECU 19 updates the associated set of likelihood data. Specifically, the ECU 19 calculates the product (posterior probability) of the prior probability calculated for each of the seat positions 1 to N and the associated likelihood. Then, the ECU 19 divides the product for each of the seat positions 1 to N by the sum of the products for all of them and estimates the quotient to be a new likelihood. The product for each of the seat positions is divided by the sum of the products for all of them so that the sum of the likelihood data for the positions is 1.

Thus, an equal probability is set initially as the estimated likelihood allotted to each of the seat positions 1 to N. Every time the ECU 19 makes an inference for one of the users in one of the environment and condition zones, the ECU 19 updates the associated set of likelihood data based on the associated posterior probabilities. As a result, every time the user uses the vehicle, the ECU 19 customizes for the user the associated set of likelihood data. This makes it possible to accurately estimate the optimum seat position for the particular user.

The ECU 19 prepares statistical data and likelihood data for each of the kinds of environmental information and physical information. The prepared data are stored in the memory 20.

Figure 3:
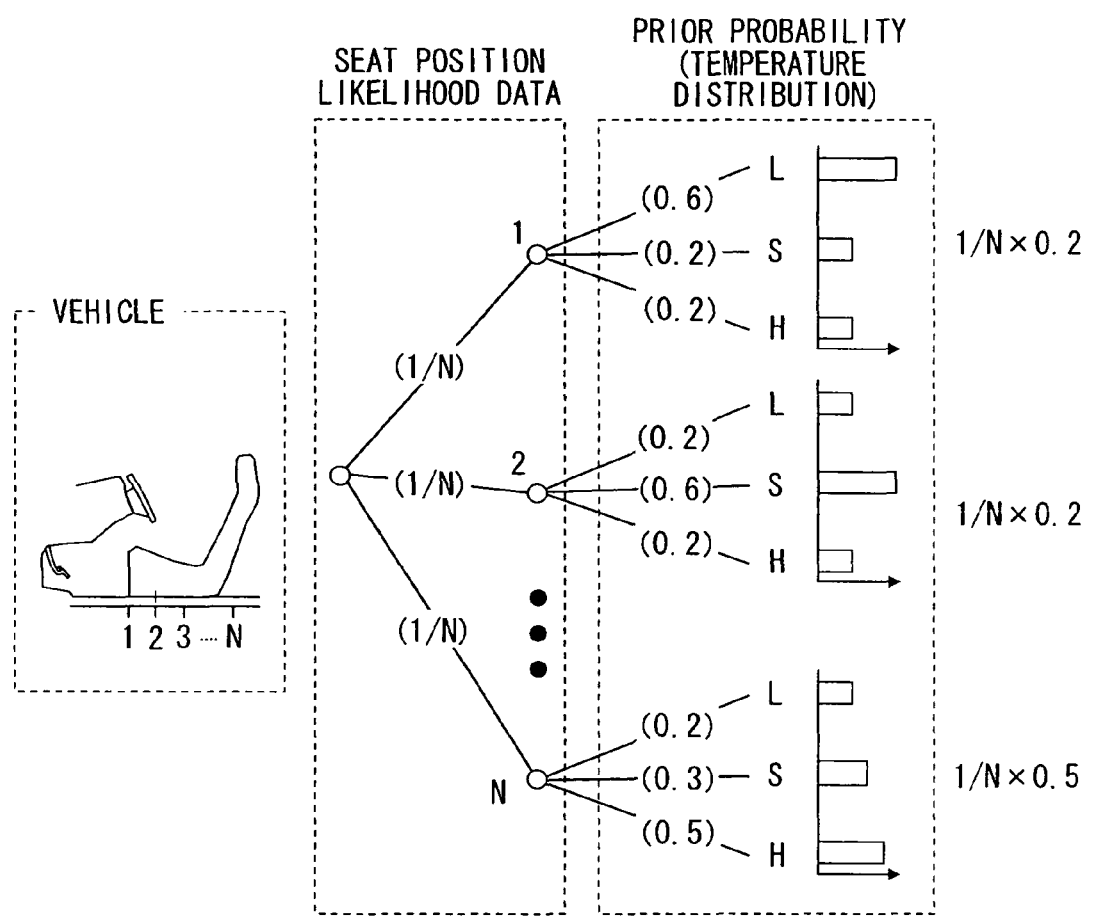
FIG. 3 is an explanatory diagram showing another inference model, with which the driving position control system makes an inference in order to estimate the optimum seat position according to air temperature in which a user gets into the vehicle.

In FIG. 3, another inference model is shown. With this model, the ECU 19 makes an inference to infer the driving position optimum for one of the users at the outside (or inside) air temperature sensed as one of the kinds of environmental information by the temperature sensor 16 when this user gets into the vehicle. The ECU 19 makes this inference in a manner similar to that for the example shown in FIG. 2. Specifically, the ECU 19 calculates the product (posterior probability) of the estimated likelihood (1 to N) allotted to each of the seat positions 1 to N and the associated rate (prior probability) allotted to the temperature zone including the sensed temperature. Then, the ECU 19 estimates that the seat position associated with the largest product will be optimum.

For example, the temperature may be divided into three zones, that is, low (cold) temperature zone L (below 15° C.), suitable temperature zone S (15 to 26° C.) and high (hot) temperature zone H (over 26° C.). If the temperature sensed by the temperature sensor 16 is included in the high temperature zone H, as shown in FIG. 3, the product of the estimated likelihood and prior probability which are allotted to the seat position N is largest, so that the ECU 19 estimates the position N to be optimum.

The optimum driving position may be estimated from only one of the kinds of environmental information and physical information. In this case, the optimum position can be the seat position estimated by the inference described with reference to FIG. 2 or 3. As stated with reference to FIGS. 2 and 3, the optimum driving position may be estimated from two or more of the kinds of information. In this case, the optimum driving positions estimated from the different kinds of information may differ. This makes it necessary to integrate the estimation results so as to find one optimum driving position.

The integration can be done by means of addition or multiplication. Specifically, the ECU 19 calculates the product of the estimated likelihood for each of the driving positions and the associated prior probability for each of the environment or condition zones from the likelihood data and statistical data stored in the memory 20 for each of the kinds of information. Then, the ECU 19 adds or multiplies together the products calculated for each of the driving positions.

Such integration may be done by means of addition in the examples shown in FIGS. 2 and 3. In this case, the posterior probabilities (additional values) for the seat positions 1, 2 and N are:

$$0.2/N+0.2/N=0.4/N;$$

$$0.6/N+0.2/N=0.8/N;$$

$$0.2/N+0.5/N=0.7/N;$$

respectively. Because the posterior probability for the seat position 2 is the highest, this position can be estimated to be optimum.

Such integration makes it possible to estimate the optimum driving position for each of the users from two or more of the kinds of environmental information and physical information.

It is preferable that the kinds of environmental information about the environment in which each of the users gets into the vehicle and the kinds of physical information about his or her physical condition in which the user gets into it include the time for which the user drives it, his or her heart rate, etc. in addition to the air temperatures outside and inside it and the date and time when the user gets into it. All these kinds of information influence the user's preference in his or her driving position. The user tends to be thinly dressed in high temperature. The driving position which is suitable for the user when the user is lightly dressed may differ from the driving position which is suitable for the user when the user is heavily dressed. If the driver drives the vehicle for a long time, the driver gets tired and tends to want to lean back in the driver seat more comfortably. The driver's heart rate correlates to how tired or tense the driver is. By taking account of the date and time when the user gets into the vehicle, it is possible to cope with seasonal or other changes in the user's driving position preference.

Figure 4:
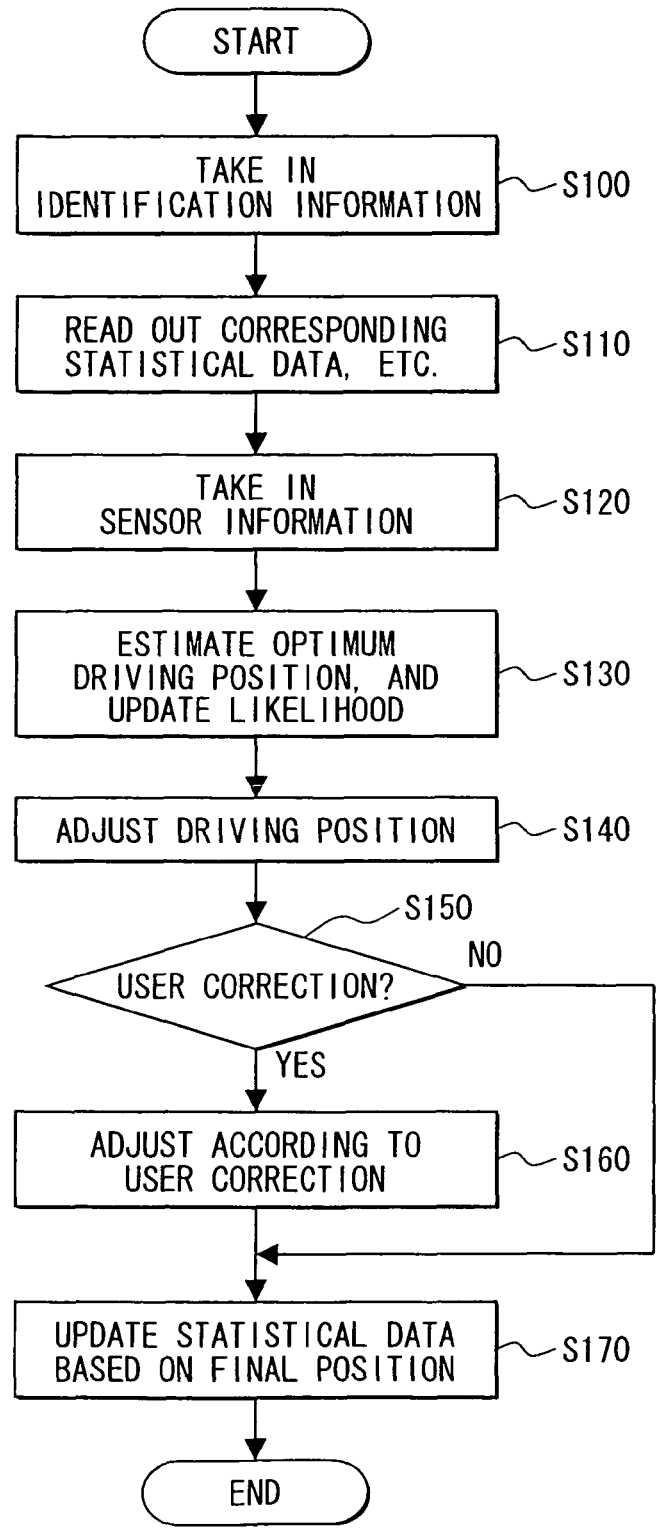
FIG. 4 is a flowchart showing control processing performed by the driving position control system.

The ECU 19 is programmed to perform the control processing shown in FIG. 4. First, at S100, the ECU 19 takes in the identification information on one of the users from the user identification device 14. Next, at S110, the ECU 19 reads out the statistical data and likelihood data on one of the kinds of environmental information and physical information for the identified user from the memory 20.

At S120, the ECU 19 takes in the sensor information detected by means of the sensors of the sensor group 15 which are associated with this kind of information.

At S130, the ECU 19 determines which of the environment and condition zones the detected information taken in at S120 falls into. At this step, the ECU 19 calculates the product of the estimated likelihood allotted to each of the driving positions in the likelihood data read out at S110 and the associated prior probability allotted to the determined zone in the statistical data read out at S110. At this step, the ECU 19 estimates that the driving position associated with the largest product will be optimum. At the same time, as stated already, the ECU 19 updates the likelihood data based on the product of the estimated likelihood and the prior probability.

If it is necessary to estimate the optimum driving position from two or more of the kinds of information, as stated already, the ECU 19 estimates one optimum driving position by integrating, by means of addition or multiplication, the posterior probabilities calculated from these kinds of information.

At S140, the control system adjusts the driving position to the optimum position estimated at S130. At S150, the ECU 19 determines whether the user has corrected the adjusted position. If the user has corrected the position, the control system readjusts it according to the user's correction at S160. Subsequently, the ECU 19 executes S170. If the user has not corrected the position, the ECU 19 skips S160 and executes S170.

At S170, the ECU 19 regards the driving position as definite or final based on the change of gear position from parking to driving, the release of the parking brake, the depression of the accelerator pedal, or another action taken by the user when the user starts driving the vehicle. At this step, the ECU 19 updates the statistical data for the user based on the definite position.

Second Embodiment

According to a second embodiment, the control system 1 has a radio communication device 24 in place of the user identification device 14. Otherwise, the control system 1 is substantially identical in structure with the control system 1 shown in FIG. 1. The communication device 24 communicates with a portable device 30, which may be a cell phone or an IC card. Each portable device 30 is carried by a user and stores his or her user identifier. The ECU 19 of this system identifies the user by acquiring his or her user identifier from his or her portable device 30 through the communication device 24.

Each portable device 30 might be fitted with a memory which stores statistical data and likelihood data so that the ECU 19 could acquire statistical data and likelihood data by means of radio communication between the communication device 24 and portable device 30. In this case, if a user gets into a rental car or another vehicle which is of the same type as the vehicle, it is possible to immediately adjust the driving position in that vehicle according to the user's preference.

Third Embodiment

Figure 5:
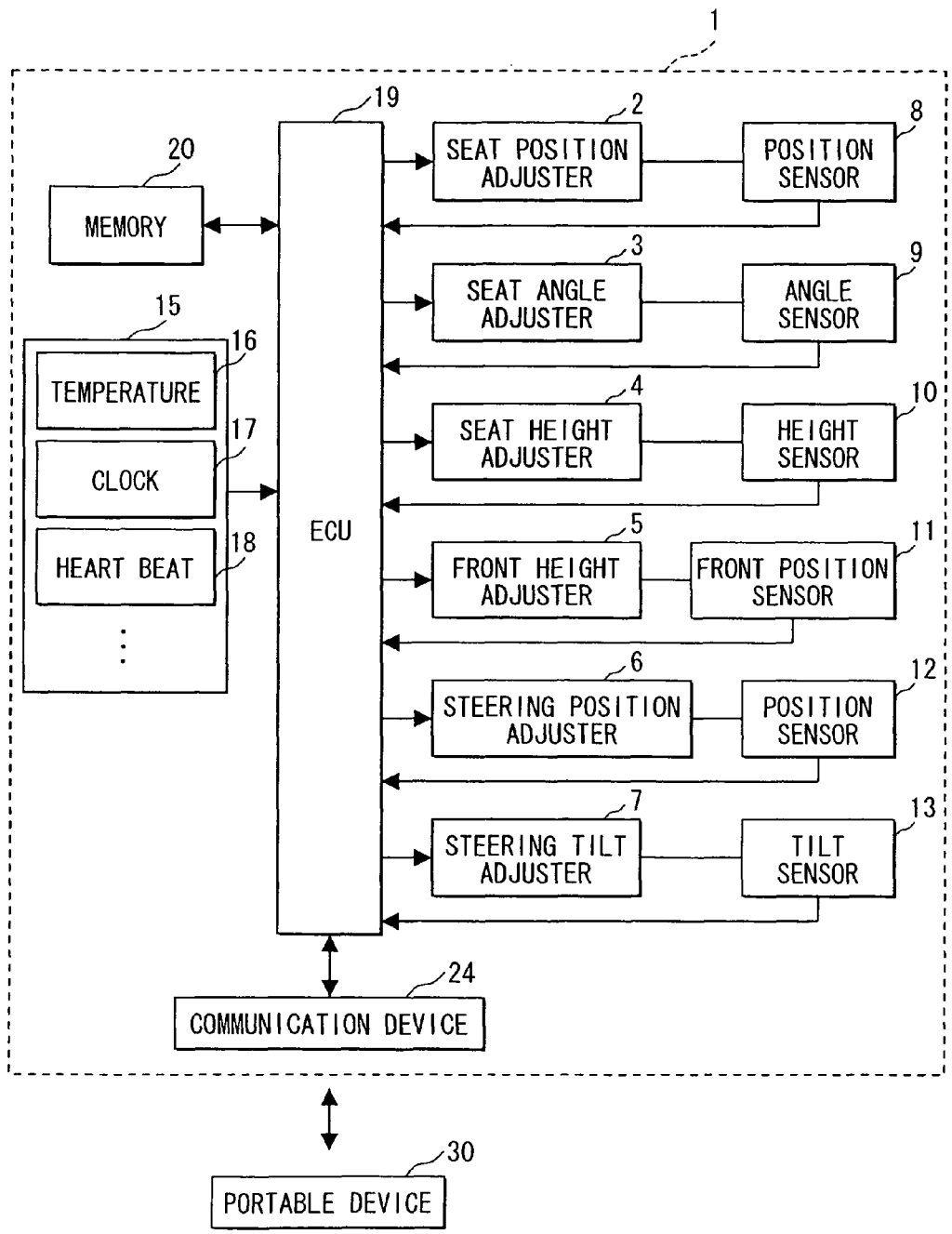
FIG. 5 is a block diagram showing a driving position control system for a vehicle according to a second embodiment of the present invention.
Figure 6:
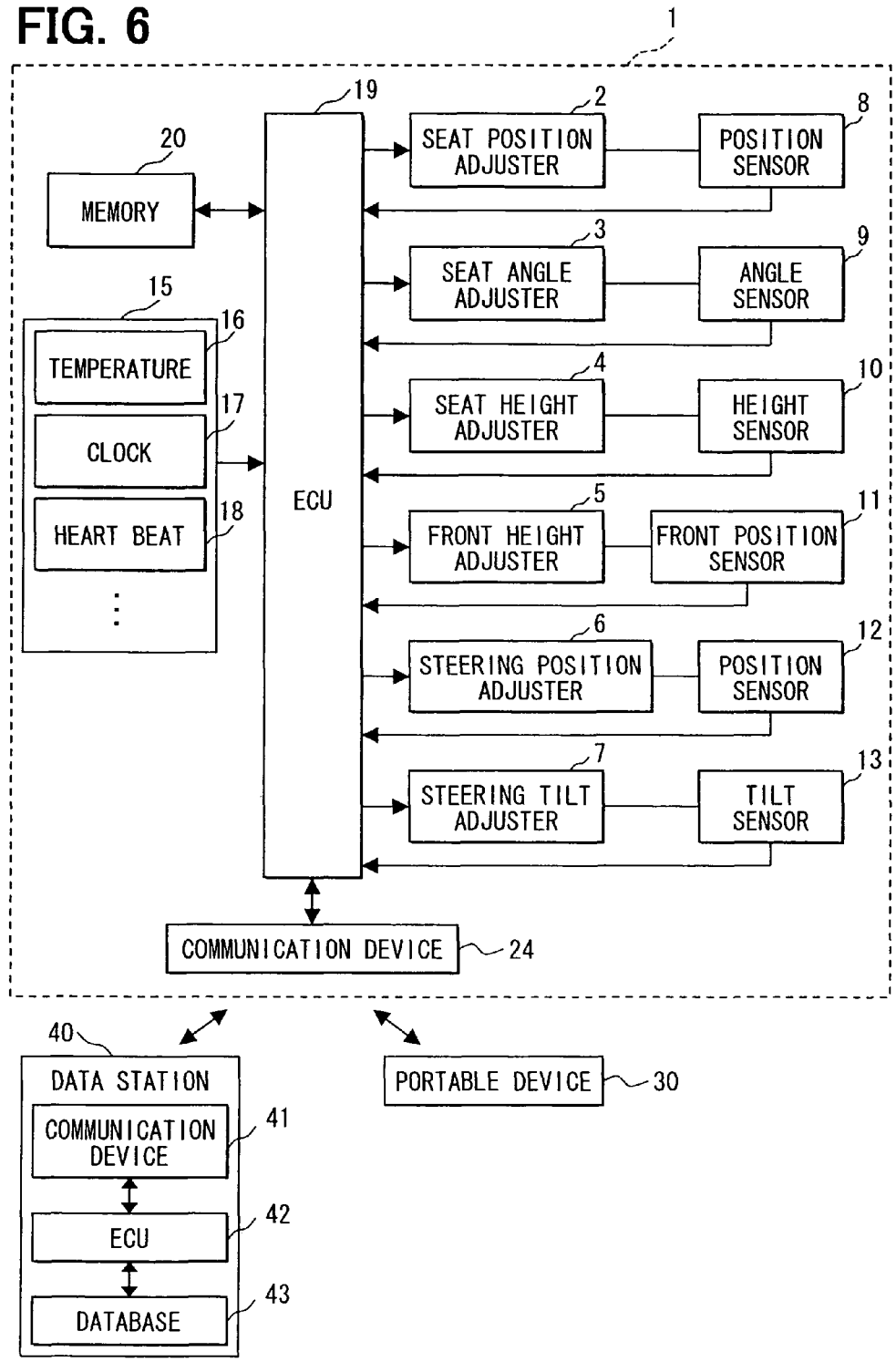
FIG. 6 is a block diagram showing a driving position control system for two or more vehicles according to a third embodiment of the present invention.

According to a third embodiment, the control system 1 is identical with the control system shown in FIG. 5. The communication device 24 communicates with a data management station 40, which has a memory (database) 43 for storing statistical data and likelihood data. The management station 40 is capable of a plurality of control systems of other vehicles which are identical with that shown in FIG. 6.

The data management station 40 has a communication device 41 and an ECU 42. The communication device 41 communicates with the vehicle communication device 24 of each control system 1. The management station 40 stores the statistical data and likelihood data for two or more users. The ECU 42 identifies the users and distinguishes the data for them. This makes it necessary to use user ID information additionally for the communication between each control system 1 and the management station 40. Each vehicle communication device 24 may store user ID information and transmit it to the management station 40 together with the data output from the associated vehicle ECU 19. Two or more users may use each control system 1. In this case, the users' IDs may be registered in the communication device 24 of the control system 1 which they use. When one of the users uses the control system 1, this user selects his or her registered ID. Alternatively, each of the users may carry the portable device 30, which stores his or her user ID. Each vehicle communication device 24 acquires each of the stored IDs by communicating with the associated portable device 30.

The memory of each portable device 30 may store sets of statistical data and sets of likelihood data on different types of vehicles for the associated user. Alternatively, the memory 43 of the data management station 40 may store groups of statistical data each for one of the users and groups of likelihood data each for one of the users. Each of the groups of statistical data includes sets of statistical data on different types of vehicles. Each of the groups of likelihood data includes sets of likelihood data on the types of vehicles. The communication device 24 of each control system 1 may store an identifier for the type of the vehicle. The memory 43 of the station 40 or the memory of the portable device 30 stores statistical data and likelihood data in association with the vehicle type identifier. This makes it possible to store statistical data and likelihood data for each of the vehicle types. When one of the users gets into one of the vehicles 1, its ECU 19 acquires the associated statistical data and likelihood data for the type of this vehicle from the center memory 43 or the memory of this user's portable device 30 through the communication device 24 of the vehicle. This makes it possible to estimate the driving position likely to be optimum for the user in each control system 1 from the associated statistical data and likelihood data for the type of the vehicle. Accordingly, the control system can be applied even to the vehicles of different types owned by a user.

Fourth Embodiment

Figure 7:
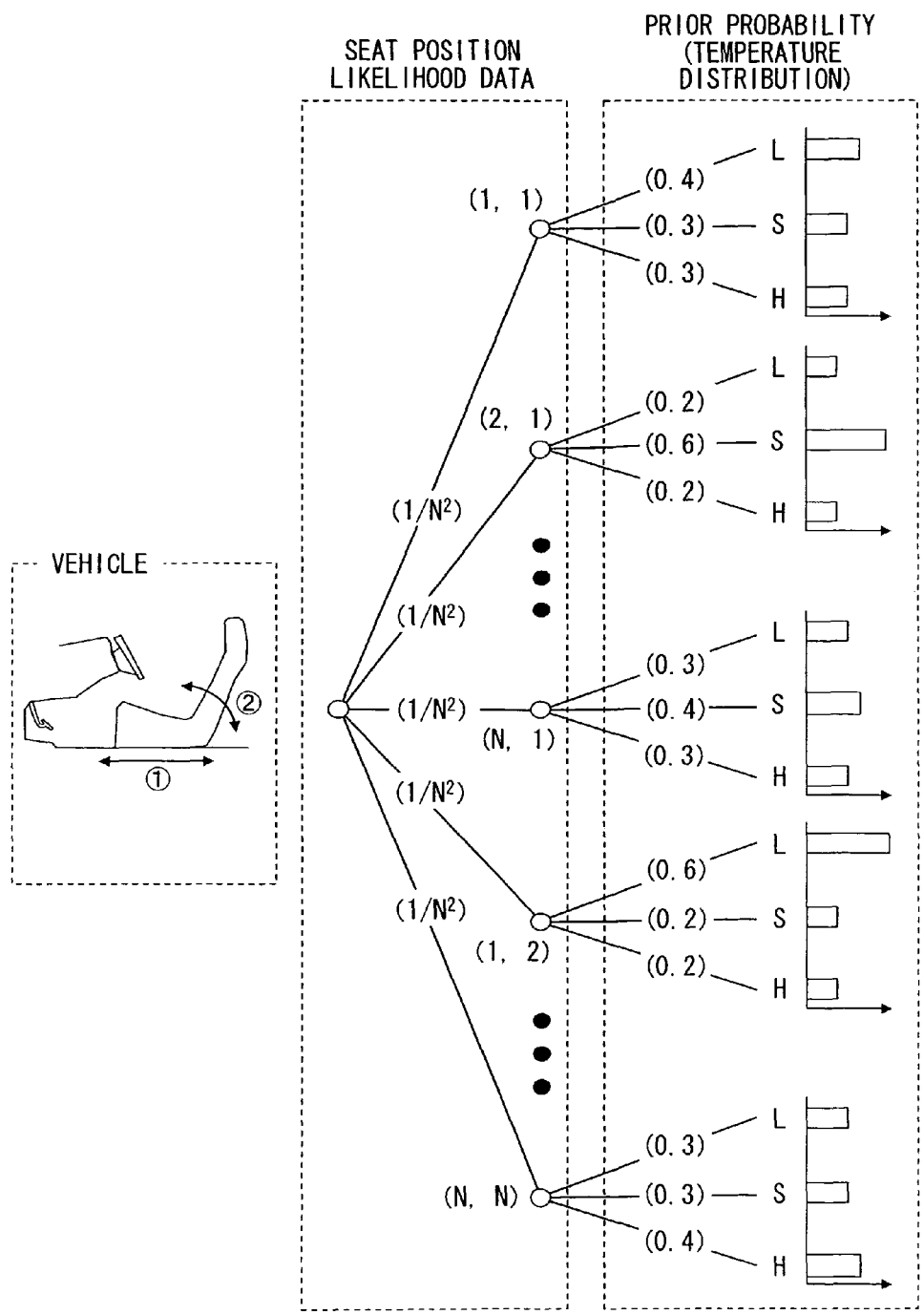
FIG. 7 is a block diagram showing an inference model in a driving position control system according to a fourth embodiment of the present invention.

According to a fourth embodiment, a plurality of optimum position, angle, etc. are estimated at the same time by setting statistical data and likelihood data for combinations of position, angle, etc. as shown in FIG. 7.

In FIG. 7, a number N of seat positions in the forward and backward directions in a vehicle and the number N of seat back angles in it are combined into the number N2 of combinations (1, 1) to (N, N) of seat position and seat back angle for each user.

The likelihood data for the seat position and seat back angle for each user include probabilities allotted to the combinations (1, 1) to (N, N). The statistical data for the seat position and seat back angle for each user include prior probabilities allotted to the combinations (1, 1) to (N, N) for some environment zones. If the environmental information is the air temperature sensed by the sensor 16 outside or inside the vehicle when the user gets into the vehicle, the statistical data include prior probabilities allotted to the combinations for three (low, suitable, and high) temperature zones. It is possible to find the optimum position and angle by making one inference with such an inference model.

The positions, angles, etc. which can be combined are not limited to the seat positions and the seat back angles as shown in FIG. 7. It is possible to combine the seat positions, the seat back angles, etc. and find the optimum positions, angles, etc. by making one inference.

What is claimed is:

1. A driving position control system for a vehicle, in which one of plural candidate driving positions is selected, the control system comprising:
   a detecting means for detecting, when a user enters into the vehicle, environmental information on an environment and physical information on a user's physical condition, the environment being divided into environment zones, and the physical condition being divided into condition zones;
   a storing means for storing statistical data each representing a probability of the user selecting one of the candidate driving positions in one of the environment zones and the condition zones;
   an estimating means for estimating, from the detected information and the stored statistical data, an optimum driving position among the candidate driving positions as most likely to be optimum for the user in the environment or condition zone into which the detected information falls; and
   a driving position adjusting means for adjusting a present driving position in the vehicle to the optimum driving position estimated to be optimum.

2. The driving position control system of claim 1, further comprising:
   a driving position detecting means for detecting the present driving position; and
   an updating means for updating the stored statistical data based on the driving position selected finally by the user and detected by the driving position detecting means.

3. A driving position control system for a vehicle, in which one of plural candidate driving positions is selected, the control system comprising:
   a detecting means for detecting, when a user enters into the vehicle, at least one of environmental information on an environment and physical information on a user's physical condition, the environment being divided into environment zones, and the physical condition being divided into condition zones;
   a storing means for storing statistical data each representing a probability of the user selecting one of the candidate driving positions in one of the environment zones and the condition zones;
   an estimating means for estimating, from the detected information and the stored statistical data, an optimum driving position among the candidate driving positions as most likely to be optimum for the user in the environment or condition zone into which the detected information falls; and
   a driving position adjusting means for adjusting a present driving position in the vehicle to the optimum driving position estimated to be optimum, wherein
   the storing means further stores likelihood data each representing the estimated likelihood of one of the candidate driving positions being suitable for the user; and
   the estimating means calculates a product of the estimated likelihood for each of the candidate driving positions and an associated probability of selection for each of the environment and condition zones, and estimates that the candidate driving position associated with a largest product will be likely to be optimum for the user.

4. The driving position control system of claim 3, wherein:
   the storing means initially stores equal likelihood data for the candidate driving positions and updates the likelihood data for each of the candidate driving positions based on the product of the associated likelihood and each of the associated probabilities.

5. The driving position control system of claim 3, wherein:
   the detecting means detects kinds of environmental information and physical information;
   the storing means stores the statistical data as first data sets each for one of the kinds of environmental information and physical information and the likelihood data as second data sets each for one of the kinds;
   the estimating means being adapted to
      calculate, based on each of the detected kinds of environmental information and physical information, the product of the estimated likelihood for each of the candidate driving positions and an associated probability for each of the environment and condition zones from associated data sets in the storing means,
      integrate by means of addition or multiplication the products calculated for the kinds of environmental information and physical information, and
      estimate one of the candidate driving positions likely to be optimum for the user from the result of the integration.

6. The driving position control system of claim 1, wherein:
   the environmental information includes air temperatures outside and inside the vehicle, date and time when the user gets into the vehicle, and time for which the user drives the vehicle, and
   the physical information includes a heart rate of the user.

7. The driving position control system of claim 1, wherein:
   the driving position adjusting means adjusts at least one of a plurality of movable parts of a driver seat in the vehicle.

8. The driving position control system of claim 7, wherein:
the driving position adjusting means adjusts a present position of a steering wheel in the vehicle.

9. The driving position control system of claim 7, wherein:
the driving position adjusting means adjusts the angles of one of mirrors of the vehicle.

10. The driving position control system of claim 3, further comprising:
an identifying means for identifying the user who gets into the vehicle;
the storing means stores the statistical data and the likelihood data with respect to each user.

11. The driving position control system of claim 10, wherein:
the identifying means includes a communication device capable of communicating with a portable terminal, which is carried by the user and stores a user identifier, and
the identifying means identifies the user by the user identifier received from the portable terminal by the communication device.

12. The driving position control system of claim 11, wherein:
the storing means is fitted in the portable terminal, and
the communication device acquires the statistical data and the likelihood data by communicating with the portable terminal.

13. The driving position control system of claim 10, further comprising:
a first communicating means fitted in the vehicle and capable of communication with a data management station, which includes the storing means and a second communicating means for communication with the first communicating means;
wherein the estimating means acquires the statistical data and the likelihood data through communications between the first and second communicating means.

14. The driving position control system of claim 12, wherein:
the storing means stores the statistical data and the likelihood data for each of different vehicle types; and
the estimating means estimates the optimum driving position for the user from the statistical data and the likelihood data of one vehicle type, into which the user gets.

15. A driving position control method for a vehicle comprising:
detecting by a sensor a parameter including at least a user's physical condition, when a user gets into a vehicle;
determining a zone of the parameter detected by the sensor among a plurality of zones predetermined with respect to the parameter;
storing statistical data in a memory, the statistical data indicating prior probability of a plurality of driving positions in respect of a combination of each driving position and a zone of the parameter;
estimating an optimum driving position based on the determined zone and the statistical data in the memory by selecting one of the plurality of driving positions at which the prior probability for the determined zone is highest;
adjusting automatically a driving position to the estimated optimum driving position;
detecting a final driving position taken by the user after automatic adjustment of the driving position; and
updating the statistical data of the memory in accordance with the detected final driving position taken by the user.

16. The driving position control method of claim 15, wherein:
the parameter includes a heart beat rate of the user detected by a heart beat sensor, when the heart beat sensor is touched by the user.

17. The driving position control method of claim 15, further comprising
calculating, for each of the plurality of driving positions, a product of the estimated likelihood of each of the plurality of driving position with the prior probability of each of the plurality of driving positions with respect to the determined zone of the parameter.

18. The driving position control method of claim 17, wherein
estimating an optimum driving position based on the determined zone and the statistical data in the memory includes selecting one of the plurality of driving positions at which the product of the likelihood the driving position and the prior probability of the driving position with respect to the determined zone of the parameter is highest.

19. The driving position control system of claim 1, wherein:
the storing means further stores likelihood data each representing the estimated likelihood of one of the candidate driving positions being suitable for the user; and
the estimating means calculates a product of the estimated likelihood for each of the candidate driving positions and an associated probability of selection for each of the environment and condition zones, and estimates that the candidate driving position associated with a largest product will be likely to be optimum for the user.

* * * * *